United States Patent Office 3,404,602
Patented Oct. 8, 1968

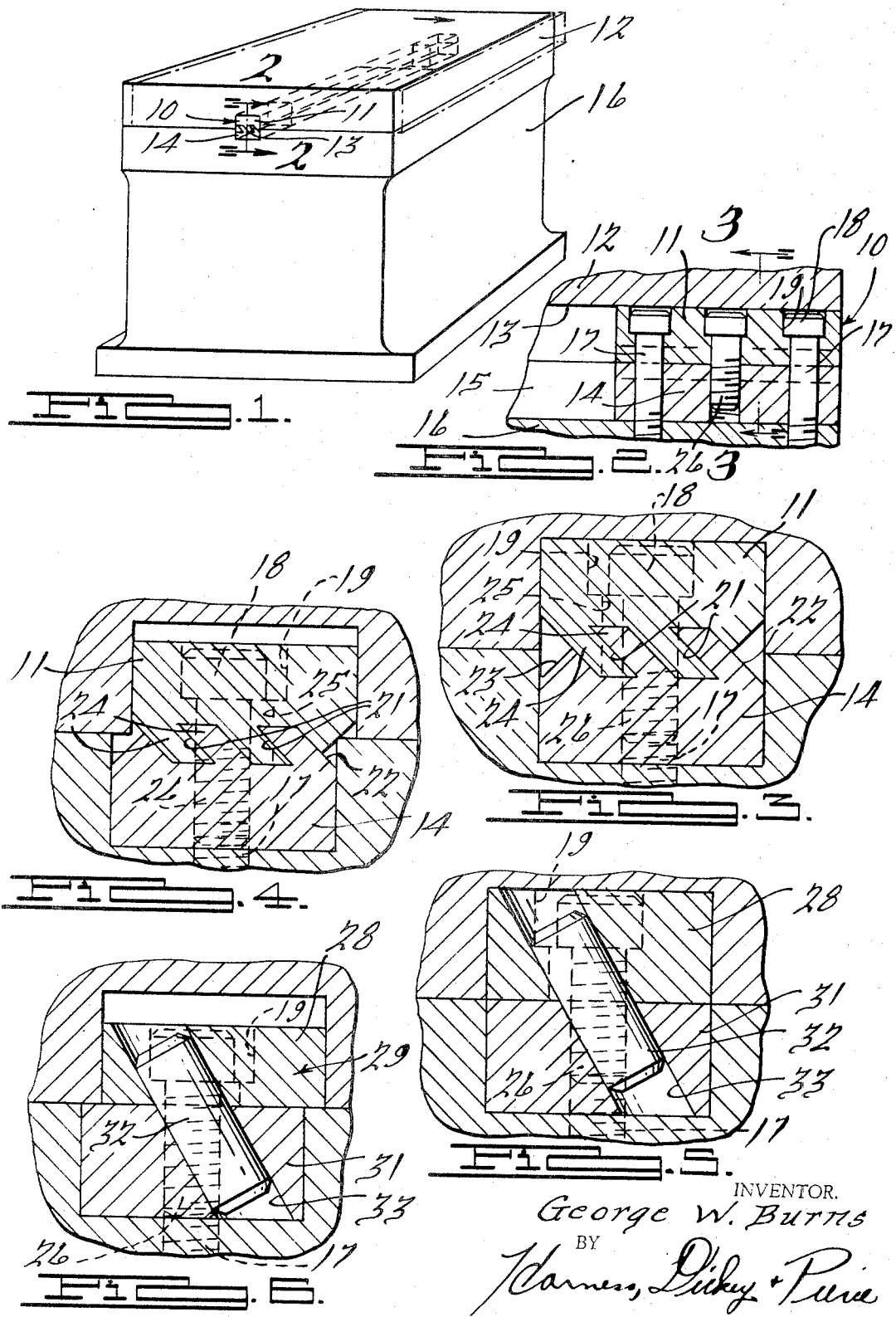

3,404,602
ADJUSTABLE OFFSET KEY
George W. Burns, 1240 Blairmoor Court,
Grosse Pointe Woods, Mich. 48236
Filed May 18, 1966, Ser. No. 551,130
10 Claims. (Cl. 90—58)

ABSTRACT OF THE DISCLOSURE

This disclosure relates to an offsettable key having two elements disposed in slots in two relatively moveable members which are shiftable laterally to locate one member relative to the other along their pathes of relative longitudinal movement.

Rectangular keys of substantial length are employed on a bed of a machine to accurately guide a table therealong in reciprocation. It is found now and then that it is desirable to shift the table transversely of the key and this has been done heretofore through the manufacture of a special key having the upper half offset from the lower half the proper amount to produce the desired shift. This requires a difficult and very accurate machining operation and is therefore quite expensive.

To overcome this difficulty, the present invention provides a key which has the upper half shiftable relative to the lower half by a facing operation. The two halves have angularly disposed fingers, preferably at a 45° angle, spaced apart the width of the fingers so that the upper and lower halves may be made as a continuous length. Two sections are cut from the length and one section is inverted relative to the other and the fingers of each are disposed in the spaces of the other. Such an assembly provides a square or rectangular key of a desired cross-sectional dimension and length. If the upper half is to be shifted laterally relative to the lower half, the end of the fingers are planed an equal amount which is the amount the upper section will shift relative to the lower section when the fingers are disposed at a 45° angle.

This same shifting can be obtained by employing dowel pins in angularly disposed aperatures through the key sections, the apertures preferably being disposed at a 45° angle. In the example herein illustrated the angle is 30° from the horizontal so that the face machining will require an amount to be machined equal to the tangent of 30° times the amount of shift desired. The two half sections are held together and secured to the base by screws with slots in apertures in the upper half of the key to permit the lateral shifting thereof relative to the screws and lower half.

Accordingly, the main objects of the invention are: to provide a key made of an upper and lower section so related as to permit the accurate shifting of the upper section relative to the lower section; to provide a shiftable key made from two like strips of material having fingers thereon extending outwardly thereof in angular relation thereto with the fingers spaced apart the width of the finger; to employ like upper and lower elements having angular fingers spaced apart the width of the fingers to permit them to nest with each other to produce a key with the two sections shiftable lateral of each other by a facing operation on the ends of the fingers; to provide a key of upper and lower rectangular elements having aligned angularly disposed slots containing pins which cause the upper element to shift relative to the lower when the upper engaged surface is faced, and in general, to provide a shiftable key which is simple in construction, positive in adjustment and economical of manufacture.

Other objects and features of novelty of the invention will be specifically pointed out or will become apparent when referring, for a better understanding of the invention, to the following description taken in conjunction with the accompanying drawing, wherein:

FIG. 1 is a perspective view of a table on a base guided for longitudinal movement thereon by a key embodying the present invention;

FIG. 2 is an enlarged broken sectional view of the structure illustrated in FIG. 1, taken on the line 2–2 thereof;

FIG. 3 is an enlarged sectional view of the structure illustrated in FIG. 2, taken on the line 3–3 thereof with the adjustable sides in parallel relationship;

FIG. 4 is a view of the structure illustrated in FIG. 3, with the upper section shifted laterally relative to the lower section;

FIG. 5 is a view of structure, similar to that illustrated in FIG. 3 showing another form of the invention, and FIG. 6 is a view of the structure illustrated in FIG. 5 with the upper section shifted laterally relative to the lower section.

Referring to FIGURES 1 to 4, the key 10 of the present invention has the upper section 11 extending within the slot 13 in the table 12 and the lower section 14 supported within a slot 15 in a base 16. The table 12 is guided on the base 16 for longitudinal movement by the key which is secured in the slot 15 in the base 16 by screws 17. The screws extend through apertures in the upper and lower portions 11 and 14 of the key sections and the heads 18 of the screws are recessed in apertures 19 in the upper key section.

Referring to FIG. 3, it will be seen that the cross section of key sections 11 and 14 are the same and are constructed from a rectangular strip of material. Slots 21 are milled, broached, cast or otherwise provided in the strip along with side sloping surfaces 22 and 23. The slots 21 are disposed at an angle of 45° providing fingers 24 therebetween of the same width as the slots. One of the pieces of the strip forms the bottom section 14 while another piece thereof forms the top section 11. When in assembled relation as illustrated in FIG. 3, it will be noted that a perfect square section is provided by the assembly of the two parts. It will be further noted that the apertures 19 and 25 for the head 18 and the screw body in the section 11 are elongated transversely of the key. It will be further noted that a screw 26 is shorter than the screws 17 for clamping the upper and lower pieces together when not secured by the screws 17 within the slot 14.

If the table is to be shifted say to the right relative to the base 16, the key is mounted end for end as illustrated in the figures. The key is removed and the upper and lower sections 11 and 14 are disassembled with the upper section 11 inverted and placed along the side or in extension of the lower section 14 and the ends of the fingers 24 ground a predetermined amount depending upon the amount of shifting required of the upper section 11 of the key relative to the lower section 14 thereof. If the shift is to be .05 of an inch, then .05 of an inch will be machined off of the ends of the fingers to permit the upper and lower portion to have the top and bottom thereof move toward each other .05 inch. Because of the 45° angle of slope of the fingers the upper section 11 will shift .05 inch to the right relative to the lower section 14 as illustrated in FIG. 4. Thereafter, the screw 26 clamps the two portions together and the screws 17 secure the key within the slot 14 of the base 16.

In FIGS. 5 and 6 a further form of the invention is illustrated that wherein the upper section 28 of a key 29 is secured to a lower section 31 in fixed relation to each other by a screw 26. The upper and lower portions are of the same thickness and the outer sides are maintained in aligned relation by pins 32 disposed in angular apertures 33. When the upper section 28 is to be shifted relative to the lower section 31, the bottom face of the upper section is machined the amount of shifting to the right which will be the cotangent of the angle of slope of the aperture times the amount machined as illustrated in FIG. 6. When the pin is disposed at a 45° angle, the amount taken off the bottom of the upper section 31 will equal the amount of shift as the tangent of 45° is 1. If the apertures 33 are disposed at some lesser or greater angle than 45°, then the tangent of this angle times the amount to be shifted will give the amount to be taken from the lower face of the upper section 28.

In either arrangement herein illustrated and described, a two-piece key is provided so constructed that the upper section will shift laterally relative to the lower section by merely dressing the one or both adjacent faces of the two sections. The amount of this dressing relative to the amount of shift desired depends upon the angle of the fingers or pins which positions the two sections relative to each other.

What is claimed is:

1. In a key having an upper and a lower section, said sections having aligned apertures disposed at an angle to the adjacent faces thereof, and means extending into said apertures for preventing the upper and lower sections from moving laterally relative to each other.

2. A key as recited in claim 1 wherein a screw extends through an aperture in the upper section into a threaded aperture in the lower section.

3. The key as recited in claim 2 wherein the apertures in the upper section are elongated transversely thereof.

4. A key as recited in claim 1 wherein the upper and lower portions are of the same cross section having angularly disposed slots of the same width forming fingers therebetween so that the fingers of one section will nest between those of the other section.

5. A key as recited in claim 4 wherein the removal of material on the adjacent faces of the fingers causes the shifting of one portion relative to the other.

6. In a key as recited in claim 4 wherein the amount of shift is proportional to the angle of slope of the aperture.

7. In a key as recited in claim 1 wherein the upper and lower sections are exactly alike, both having angularly disposed slots and fingers on the adjacent faces which permit the fingers to nest with each other.

8. In a key as recited in claim 7 wherein the fingers slope at an angle of 45° so that the amount of lateral shift of the upper section relative to the lower section will be equal to the amount of material removed from the fingers.

9. In a key as recited in claim 1 wherein the apertures in the sections are aligned, and a pin is provided within the aligned apertures for maintaining the two sections against shifting relative to each other.

10. A key as recited in claim 9 wherein the upper section is shiftable laterally relative to the lower section an amount which is the product of the thickness of material removed from the face of the upper section which is in engagement with the lower section times the tangent of slope of the pin.

References Cited

UNITED STATES PATENTS

| | | | |
|---|---|---|---|
| 2,092,587 | 9/1937 | Olson | 308—3 |
| 2,320,776 | 6/1943 | Gorton | 308—3 |
| 2,630,353 | 3/1953 | Rutz | 308—3 |

GERALD A. DOST, *Primary Examiner.*